US007069342B1

(12) United States Patent
Biederman

(10) Patent No.: US 7,069,342 B1
(45) Date of Patent: Jun. 27, 2006

(54) COMMUNICATION SYSTEM WITH CONTENT-BASED DATA COMPRESSION

(75) Inventor: Daniel Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 673 days.

(21) Appl. No.: 09/798,816

(22) Filed: Mar. 1, 2001

(51) Int. Cl.
*G06F 15/16* (2006.01)

(52) U.S. Cl. ........................................ 709/247; 709/246

(58) Field of Classification Search ................ 370/477; 709/232, 233, 235, 247
See application file for complete search history.

(56) References Cited

U.S. PATENT DOCUMENTS

| | | | | |
|---|---|---|---|---|
| 4,730,348 | A * | 3/1988 | MacCrisken | 375/240 |
| 5,526,350 | A * | 6/1996 | Gittins et al. | 370/468 |
| 5,555,377 | A * | 9/1996 | Christensen et al. | 709/247 |
| 5,761,438 | A * | 6/1998 | Sasaki | 709/247 |
| 5,764,235 | A * | 6/1998 | Hunt et al. | 345/428 |
| 5,838,927 | A * | 11/1998 | Gillon et al. | 709/247 |
| 6,006,264 | A | 12/1999 | Colby et al. | 709/226 |
| 6,256,350 | B1 * | 7/2001 | Bishay et al. | 375/240.21 |
| 6,351,555 | B1 * | 2/2002 | Acharya et al. | 382/162 |
| 6,449,647 | B1 * | 9/2002 | Colby et al. | 709/226 |
| 6,449,658 | B1 * | 9/2002 | Lafe et al. | 709/247 |
| 6,477,143 | B1 * | 11/2002 | Ginossar | 370/230 |
| 6,501,472 | B1 * | 12/2002 | Hunt et al. | 345/428 |
| 6,563,517 | B1 * | 5/2003 | Bhagwat et al. | 715/735 |
| 6,757,429 | B1 * | 6/2004 | Hu | 382/166 |
| 2001/0008556 | A1 * | 7/2001 | Bauer et al. | 379/265.06 |
| 2001/0023454 | A1 * | 9/2001 | Fitzgerald | 709/233 |
| 2002/0059463 | A1 * | 5/2002 | Goldstein | 709/247 |
| 2002/0103938 | A1 * | 8/2002 | Brooks et al. | 709/247 |

OTHER PUBLICATIONS

Bjorn Knutsson, "Increasing Communication Performance via Adaptive Compression", in Proceedings of the Seventh Swedish Workshop on Computer Sysytems Architecture, Gothenburg, Sweden, 1998.*

Hemant Kanakia, Partho Mishra, and Amy Reibman, "An Adaptive Congestion Control Scheme for Real-Time Packet Video Transport", SIGCOMM'93, Ithaca, NY Sep. 1993.*

(Continued)

*Primary Examiner*—Glenton B. Burgess
*Assistant Examiner*—Aaron Strange
(74) *Attorney, Agent, or Firm*—Aka Chan LLP

(57) ABSTRACT

Methods and apparatus for dynamically adapting the degree of compression used in compressing data based upon the type of contents contained within a packet are disclosed. According to one aspect of the present invention, an apparatus that forwards data across a digital communications network includes a compression switch, a compression system, and an output interface. The compression switch receives the data, determines a content type associated with the data by examining the data, and assigns a compression level to the data in response to the determined content type. The compression system is arranged to compress the data based upon the compression level, while the output interface forwards the compressed data across the network. In one embodiment, the apparatus also includes a network congestion estimator that determines a level of network congestion.

9 Claims, 5 Drawing Sheets

OTHER PUBLICATIONS

Al Griffin. "Video on the Net", 1998, Web Page. Retreived on Jun. 1, 2004 from http://www.popularmechanics.com/technology/computers/1998/3/Video_Streaming/print.phtml.*

RFC 1962 "The PPP Compression Control Protocol (CCP)" Jun. 1996.

RFC 2393 "IP Payload Compression Protocol (IPComp)" Dec. 1998.

RFC 2395 "IP Payload Compression Using LZS" Dec. 1998.

RFC 2460 "Internet Protocol, Version 6 (Ipv6) Specification" Dec. 1998.

Mahanti, Anirban et al., "Traffic Analysis of a Web Proxy Caching Hierarchy", IEEE Network, May/Jun. 2000, pp. 16-23.

ArrowPoint White Paper: The Content Smart Internet.

* cited by examiner

COMMUNICATION SYSTEM WITH CONTENT-BASED DATA COMPRESSION

CROSS REFERENCE TO RELATED APPLICATION

The present invention is related to U.S. patent application Ser. No. 09/713,849, filed Nov. 15, 2000, which is incorporated herein by reference in its entirety.

BACKGROUND OF THE INVENTION

1. Field of Invention

The present invention relates generally to data communication systems. More particularly, the present invention relates to systems and methods for managing limited network capacity, as well as to systems and methods for handling data traffic having different types of content.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To accommodate the growth and demand for Internet services, service providers are rapidly installing network switching devices, such as routers, and upgrading physical media throughout their networks. For user access, dial-in lines are being replaced by digital subscriber loop (DSL), cable modem, and broadband fixed wireless. Increasingly, the network backbone exploits optical fiber physical media. Fiber is also being deployed further toward the network edge so that, for example, data over cable networks are being transformed into hybrid fiber cable (HFC) networks. However, even with these advances in data networking technologies and the high level of investment by service providers, demand for network bandwidth continues to outpace supply.

One technique that may be applied to expand the effective throughput of a network is data compression. Data compression techniques generally take advantage of redundancy inherent in many types of data. For example, text documents may be compressed by assigning a variable number of bits to individual letters depending on their frequency in the document. When letters that appear frequently in a document are encoded by a very small number of bits, the overall amount of data required to store and/or communicate the document may be greatly reduced. More sophisticated techniques may also be used to encode voice and/or video traffic.

The processing necessary to perform compression at a data source and decompression at the data destination, i.e., a data sink, often adds what may be considered to be an intolerable level of delay. This delay may be relatively insignificant for certain types of data traffic such as electronic mail, or e-mail, traffic, since e-mail is generally not read in real time. For web downloading, the delay caused by compression and decompression may be tolerable but undesirable. In general, relatively long delays caused by compression and decompression are considered to be intolerable for real time voice or video communications. As a result, minimizing the need for data compression effectively serves to minimize the time needed to transfer data traffic across a network.

Some types of data traffic are generally easier to compress than others. By way of example, it may be easier, as well as faster, to compress packets which contain text-based data than to compress packets which contain GIF-based data, even though a delay in the transmission of text-based data may be less tolerable than a delay in the transmission of GIF-based data. In some cases, it may be that slightly delaying the transmission of text-based data by compressing the text-based data is preferable to greatly delaying the transmission of GIF-based data by compressing the GIF-based data.

Therefore, what is needed are systems and methods for data communication that take advantage of the capacity increasing capabilities of data compression technology, while balancing the compression of delay sensitive traffic, e.g., high priority traffic, against the compression of traffic which is less delay sensitive but more difficult to compress in order to substantially minimize the adverse consequences of compression processing calculations.

SUMMARY OF THE INVENTION

The present invention relates to a data compression system that is arranged to dynamically adapt the degree of compression used in response to the type of content contained within a packet to be compressed. According to one aspect of the present invention, an apparatus that forwards data across a digital communications network includes a compression switch, a compression system, and an output interface. The compression switch receives the data, determines a content type associated with the data by examining the data, and assigns a compression level to the data in response to the determined content type. The compression system is arranged to compress the data based upon the compression level, while the output interface forwards the compressed data across the network. In one embodiment, the apparatus also includes a network congestion estimator that determines a level of network congestion. In such an embodiment, the determined level of network congestion is used by the compression switch in assigning the compression level to the data.

By compressing types of data based on the content of the data and, in some cases, the congestion level of a network, data may be forwarded through the network without delaying any data more than necessary. Estimating the congestion level may include determining any combination of a number of open TCP flows, a number of dropped packets, and time information such as a time of day or a day of a week. Different types of content may be compressed at different levels based not on only the priority of data, but on the ease of compression associated with the content types, the estimated compression ratio of the content types, and other content-related features. The compression levels may be dynamically adapted in response to the congestion level of the network. Hence, bandwidth within a network may be utilized in an efficient manner.

According to another aspect of the present invention, a method for forwarding data across a communications network includes determining a content type associated with the data by examining the data, and selecting a data compression method based on the determined content type. Finally, the data is compressed using the selected data compression method. In one embodiment, the method further includes determining a level of congestion associated with the communications network such that selecting the data compression method involves selecting the data compression method based upon the level of congestion.

In accordance with still another aspect of the present invention, a computer-implemented method for forwarding data across a communications network includes determining a content type associated with a first set of data by examining the first set of data. The method also includes assigning a content compression level to the first set of data based on the content type associated with the first set of data. Finally, the first set of data for data compression is selected responsive to the content compression level assigned to the first set of data. In one embodiment, the method includes determining a content type associated with a second set of data, wherein determining the content type associated with the second set of data includes examining the second set of data. In such an embodiment, a content compression level may be assigned to the second set of data based on the content type associated with the second set of data.

In another embodiment, the first set of data is included in a first packet which, in turn, is included in a stream of packets. Selecting the first set of data for data compression responsive to the content compression level assigned to the first set of data may, as a result, include selecting a data compression method for the first set of data. For such an embodiment, the method includes compressing the first set of data using the selected data compression method. Further, the contents of substantially the entire stream of packets may be compressed based on the selected data compression method.

These and other advantages of the present invention will become apparent upon reading the following detailed descriptions and studying the various figures of the drawings.

DETAILED DESCRIPTION OF THE EMBODIMENTS

Generally, the packet processing techniques of the present invention may be implemented in software and/or hardware. For example, the packet processing techniques may be implemented in an operating system (OS) kernel, in separate user processes, in a library package bound into a network application, on a specially constructed machine, or on a network interface card. In one embodiment of the present invention, these techniques may be implemented in software such as an operating system or in an application running on an operating system.

A software or software/hardware hybrid packet processing system of the invention is preferably implemented on a general-purpose programmable machine selectively activated or reconfigured by a computer program stored in memory. Such a programmable machine may be, for example, a network device designed to handle network traffic. Such network devices typically have multiple network interfaces including, but not limited to, a frame relay and ISDN interfaces. Specific examples of such network devices include routers and switches. For example, the packet processing systems of the present invention may operate on specially configured routers such as those available from Cisco Systems, Inc. of San Jose, Calif. A general architecture for some of these machines will appear from the description given below. In an alternative embodiment, the packet processing system may be implemented on a general-purpose network host machine such as a personal computer or workstation adapted to interface with computer networks.

Figure 1:
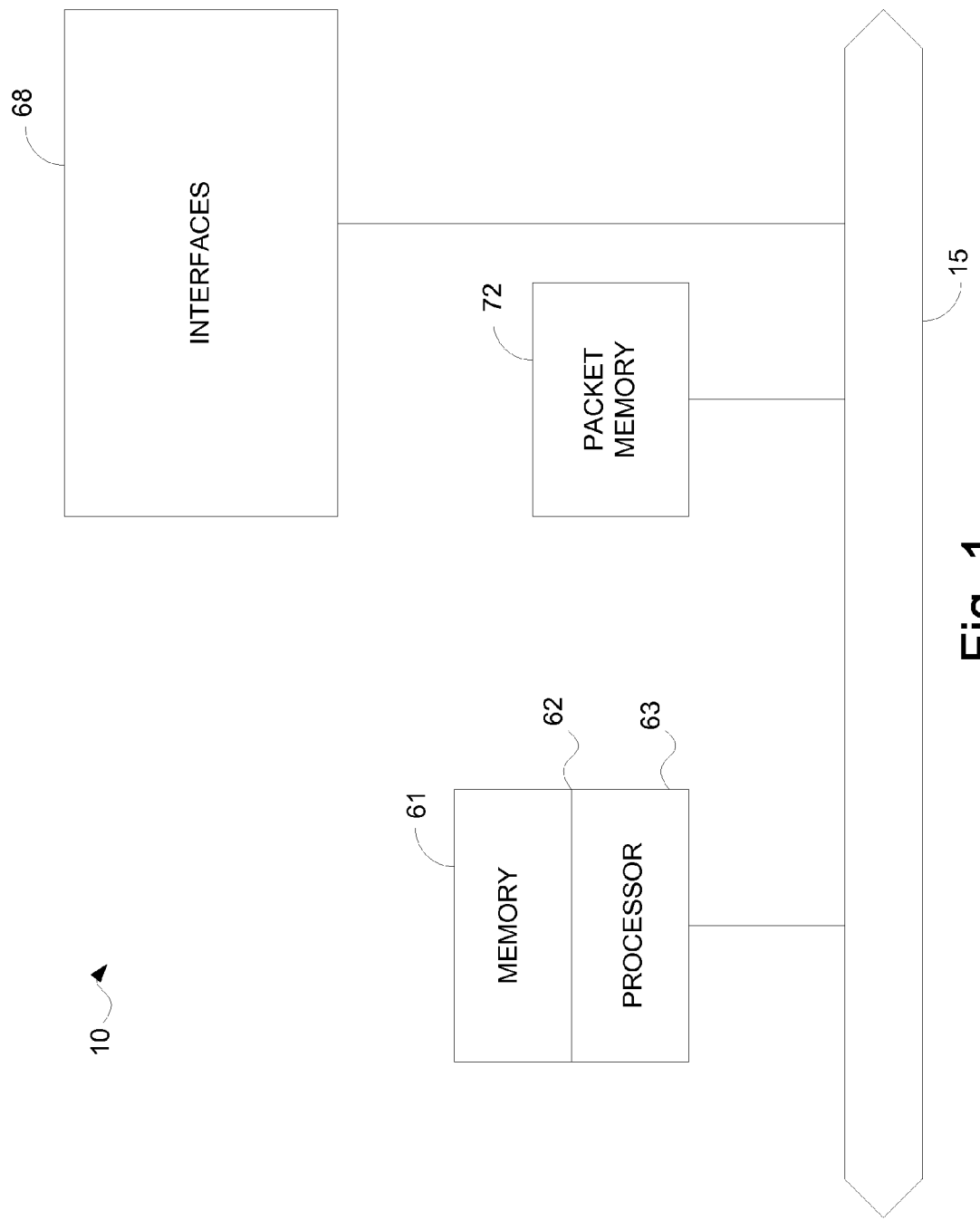
FIG. 1 depicts a router that may be used in implementing one embodiment of the present invention.

Referring initially to FIG. 1, a router 10 suitable for implementing the present invention includes a master central processing unit (CPU) 61, interfaces 68, and a bus 15, e.g., a PCI bus. As shown, CPU 61 includes a memory 62 and a processor 63. When acting under the control of appropriate software or firmware, CPU 61 is responsible for router tasks which include, but are not limited to, routing table computations, managing a network or networks, and general processing of packets. CPU 61 preferably accomplishes all these functions under the control of software which includes an operating system, e.g., a version of the Internetwork Operating Systems (IOS®) of Cisco Systems, Inc., and any appropriate applications software. CPU 61 may include one or more processors 63 such as a processor from the Motorola family or MIPS family of microprocessors. In an alternative embodiment, processor 63 may be specially designed hardware for controlling the operations of router 10. Memory 62 may generally be non-volatile random access memory (RAM) and/or read-only memory (ROM). As will be appreciated by those skilled in the art, there are many different ways in which memory may be coupled to the system.

Interfaces 68 are typically provided as interface cards, which are sometimes referred to as "line cards." Generally, interfaces 68 control the sending and receiving of data packets over the network and sometimes support other peripherals used with router 10. Among interfaces 68 that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces, FTTH interfaces, and the like. Generally, these interfaces 68 may include ports appropriate for communication with the appropriate media. In some cases, interfaces 68 may also include an independent processor and, in some instances, volatile RAM. The independent processor may control such communications intensive tasks as packet switching, media control, and management. By providing separate processors for the communications intensive tasks, these interfaces 68 allow the master microprocessor 61 to efficiently perform routing computations, network diagnostics, and security functions. Router 10 may further include a packet memory 72 for intermediate storage of packets being forwarded by router 10.

Although the system shown in FIG. 1 is one specific router that is usable to implement the present invention, it should be appreciated that router 10 of FIG. 1 is but one example of an architecture on which the present invention can be implemented. By way of example, an architecture having a single processor that handles communications as well as routing computations, etc. is often used. In general, other types of interfaces and media may also be used with a router.

Regardless of the configuration of a network device, the network device may employ one or more memories or memory modules (including memory 62) configured to store program instructions for the general-purpose network operations and packet processing functions described herein. The program instructions may control the operation of an operating system and/or one or more applications, for example.

Because instructions for general-purpose network operations and program instructions may be employed to implement the systems/methods described herein, the present invention relates to computer-readable or machine-readable media that include program instructions, state information, etc., for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). The invention may also be a data signal embodied in a carrier wave travelling over an appropriate medium such as airwaves, optical lines, fiberoptic lines, electric lines, etc. Examples of program instructions include both machine code, such as produced by a compiler, and files containing higher level code that may be executed by the computer using an interpreter.

Figure 2:
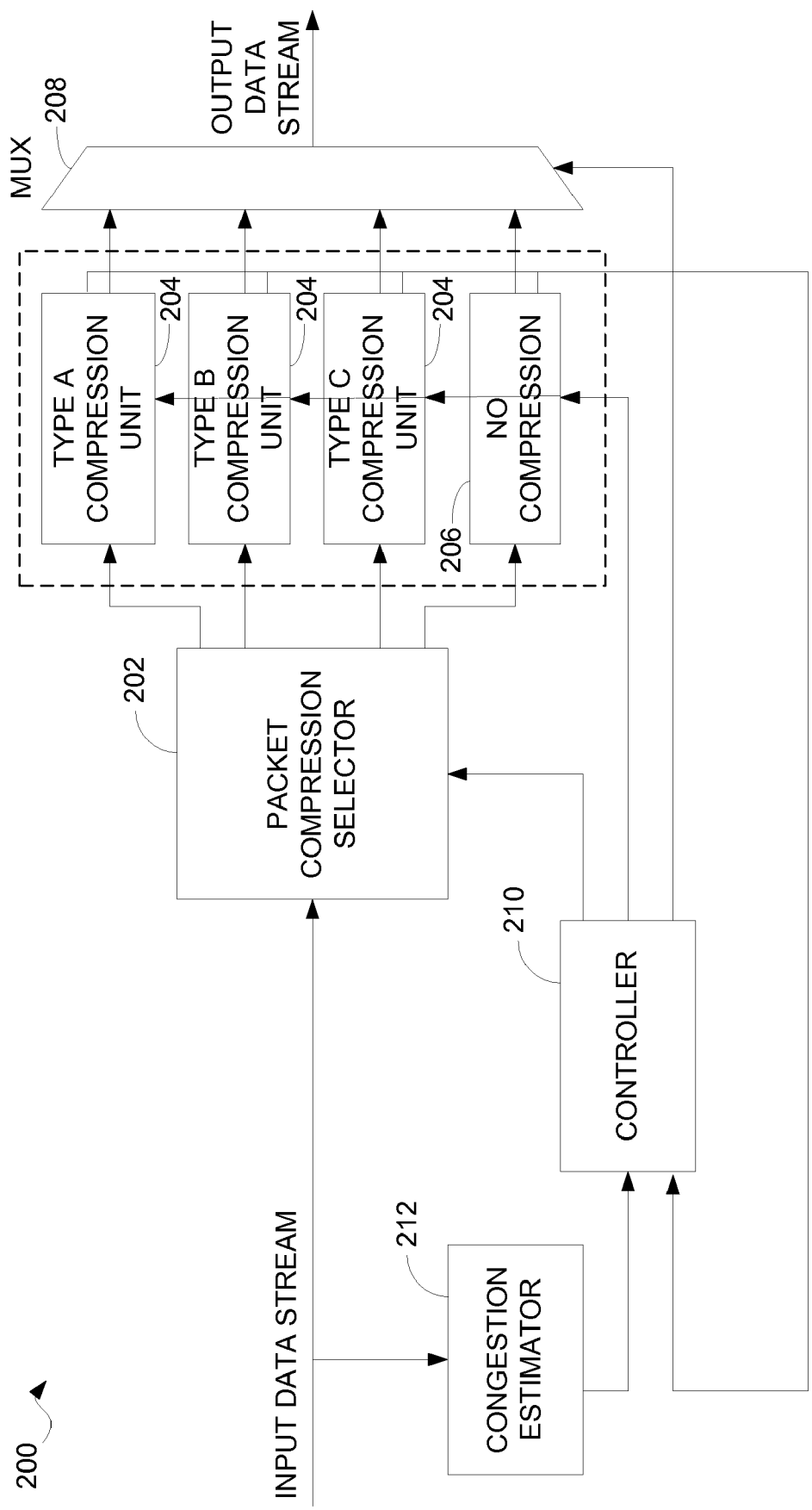
FIG. 2 depicts a data compression system based on data content type according to one embodiment of the present invention.

With reference to FIG. 2, a data compression system will be described in accordance with an embodiment of the present invention. A data compression system 200 is generally arranged to operate in a variety of data networking contexts. By way of example, a router such as router 10 of FIG. 1 may represent the interface between a customer network, such as an intranet, and a larger scale service provider network. Data compression system 200 may operate on packets forwarded from the customer network to the service provider network by applying varying degrees of data compression to manage the bandwidth that is made available to the customer by the service provider. Data compression system 200 may generally be implemented in substantially any suitable manner. Typically, data compression system 200 may be implemented in hardware and/or software of one of interfaces 68 of FIG. 1, or in software stored in memory 62 of FIG. 1.

Packets to be forwarded into a service provider network are input to a packet compression selector 202. Packet compression selector 202 determines whether to compress each packet based upon the content, i.e., the data content, of each packet. The content of each packet may include substantially any information that is of interest to an application, i.e., a client application, which may receive the packet. In an IP network, for example, the content of a packet may include information that is delivered by an application-layer server application which uses TCP or UDP as its transport layer. The information may be in substantially any suitable form including, but not limited to, a ASCII text file, a binary file, an HTML page, a Java applet, real-time audio, or real-time video.

In one embodiment, packet compression selector 202 may be arranged to inspect or examine, e.g., read, the contents of a packet. The contents of the packet may be read by a processor, such as processor 63 of FIG. 1, using, for instance, a program that either parces or examines the packet information. Packet compression selector 202 typically determines whether to compress a packet, as well as how much to compress the packet, depending upon the contents of the packet. In one embodiment, packet compression selector 202 further bases a determination on whether to compress a packet at least in part upon network congestion, or traffic. For example, in HTTP traffic, packet compression selector 202 may choose to compress a more important packet with relatively small, highly compressable, text-based data, while choosing not to compress a less important packet with a larger, GIF-based data, since it may be easier to compress text-based data. By compressing the text-based data, the GIF-based data is allocated more bandwidth to pass through the network.

As will be understood by those skilled in the art, inspecting the contents of a packet may generally either slow down the process of transferring packets within a communications network, or require more computing resources than would be required if no inspection of the contents were performed. However, typically, the bandwidth allocation and the integrity of data that is sent across a network using content-based compression render any packet inspection time, or additional computing resources used, to be considered as being tolerable.

Based on the contents of each packet and, in one embodiment, the degree of network congestion currently being experienced, packet compression selector 202 either forwards each packet to a selected one of compression units 204, or designates particular packets to be forwarded with their contents uncompressed. In general, data that is relatively easy to compress, e.g., data which is compressed and uncompressed relatively quickly, is compressed to save the time required to perform compression operations on data which is more difficult to compress, while freeing bandwidth for the transmission of data which is more difficult to compress. The degree of network congestion, or the overall network congestion level, may be a factor in the determination of the level or degree of compression which is used to compress data, if data is to be compressed at all.

The types of content of a packet may be widely varied. By way of example, types or classes of content may include, but are not limited to, text-based data, video-based data, voice-based or audio-based data, HTML data, image-based data, compressed data, formatted data, and dynamic data. The effect of compressing a particular type of data traffic is to decrease the volume of data belonging to that class that is transmitted and, as a result, reduce the share of network bandwidth allocated to the class. It should be appreciated that in some cases, the content of a packet may be mixed. In other words, rather than containing only one class of content such as voice-based data, a packet may contain two classes of content such as voice-based data and video-based data. When data includes two classes of content, the compression level used to compress the data may either be chosen based on one of the two classes of content, or on a new class of content that is defined by the two classes of content. As will be understood by those skilled in the art, the content of a packet may affect switching, e.g., content-aware switching. For content-aware flow, information flow may be forwarded based upon destination IP addresses, an associated TCP or UDP port number, and a URL associated with the content.

A packet is often included in a stream of packets. Hence, in one embodiment, the content of one packet in a stream of packets, e.g., the first packet in the stream of packets, may be inspected, and substantially the entire stream of packets may be compressed based upon the content of the one packet that is inspected. It should be understood that in the event that the first packet that is inspected does not contain data, then packets in the stream of packets may continue to be inspected until a packet which contains data is identified. By way of example, the TCP payload of a HTTP 1.1 session in a TCP flow may be read, and the rest of the packets in the TCP flow may be compressed based on the first data packet that is read.

As shown in FIG. 2, in one embodiment, there are three compression units 204, e.g., "type A", "type B", and "type C". It should be appreciated that each type corresponds to a type of data content that is compressed and, further, that the number of types may be widely varied. The type A compression unit may be used to compress a first type of data, and may include different compression levels. For example, the type A compression unit may compress the first type of data into one of a low compressed format or level, a medium compressed format, and a high compressed format. The compression levels may generally differ based upon the size of a resultant compressed format, the bandwidth required to transmit the compressed format, and the amount of time required to compress and decompress data from a compressed format. In other words, the compression levels may be dependent upon a compression ratio. Some types of data may not be compressed. Hence, block 206 is depicted to signify a type of data which will generally not be compressed.

The type B compression unit may be used to compress a second type of data, while the type C compression unit may be used to compress a third type of data. Like the type A compression unit, the type B compression unit and the type C compression unit may include different compression levels. The term "compression level" as used herein refers to the extent to which input data may be compacted. For example, a high compression level may correspond to a relatively high target ratio of quantity of input data over quantity of compressed output data, while a low compression level may correspond to a relatively low target ratio of quantity of input data over quantity of compressed output data.

Each of compression units 204 may have different associated compression levels which may operate according to different compression techniques to achieve different sets compression ratios. Alternatively, two or more of compression units 204 may utilize similar compression techniques, but with different parameters, to achieve a different set of compression ratios. Typically, compression units 204 may each implement the well-known Huffman code compression technique to enable different compression levels to be achieved. For example, the type C compression unit may use three versions of the Huffman code compression technique to achieve three different levels of compression for "type C" data.

A multiplexer 208 selects the output of one of compression units 204 or no compression block 206 to be outputted onto a network based on the availability of such output data. When multiple compression units 204 and/or no compression block 206 have data available, the data having the lowest level of compression may be outputted first as having the highest priority.

The mapping between priority levels and compression units 204, or no compression block 206, is typically determined by a controller 210. The operation of controller 210 will be described below with reference to FIG. 3, FIG. 4, and FIG. 5. In part, the mapping between priority levels and compression levels for different content types may depend on the degree of network congestion. In one embodiment, a congestion estimator 212 may be implemented to determine the amount of network congestion in the network to be traversed by the packets processed by data compression system 200.

Congestion estimator 212 may generally estimate the degree of network congestion using substantially any suitable method. For instance, congestion estimator 212 determines a degree of congestion by measuring the data flow into data compression system 200 and comparing this "input" measurement to the data flow rate authorized by an operative service level agreement (SLA) between the customer and the service provider. Alternatively, congestion estimator 212 may be arranged to receive congestion indication information from the service provider network. In one embodiment, congestion estimator 212 may estimate a congestion level based on the time of the day or the day of the week. As will be appreciated by those skilled in the art, data flow is may be a series of frames that are exchanged between connection endpoints and a port.

In one embodiment, controller 210 operates so as to compress the input data stream to accommodate current congestion conditions, while minimizing the delay caused by compression. To the extent that compression is used to shape the data flow to accommodate available bandwidth and congestion, the delay may be imposed on data that is relatively easy to compress. As congestion increases, data that is relatively easy to compress is increasingly compressed to provide bandwidth for the transmission of data that is not as easily compressed.

The operation of controller 210 to compress data based upon the content of the data generally changes as congestion across a network, e.g., the service provider network, increases. For instance, when congestion estimator 212 detects a slight increase in network congestion, data that is identified as being of a particular content type may be initially compressed at a low compression level. By way of example, packets identified as having "type A" content may be compressed using a low compression level while packets having other content types are not compressed. In the event that data having "type A" content has already been compressed, the compression level of the data may be raised in response to an increase in network congestion. Upon a further increase in network congestion, data having "type A" content may be compressed at a still higher compression level, while data having "type B" content may be initially compressed at a low compression level. It should be appreciated that, in some embodiments, as network congestion decreases, data compression system 200 reduces the compression ratio used for the different compression types to increase the speed of processing, while effectively reducing the delay imposed on the data with certain types of content, e.g., "type A" content. In other words, the compression ratios associated with the compression of data may be dynamically adapted both when network congestion increases, and when network congestion decreases. Specifically, a compression ratio may be adapted based on data content and current or estimated network traffic.

In one embodiment, "content" may be defined as substantially any information that a client application is interested in receiving. In an IP network, for instance, this information may be delivered by an application-layer server application using TCP or UDP as its transport layer. The content itself may be, but is not limited to being, a simple ASCII text file, a binary file, an HTML page, a Java applet, real-time audio, or real-time video. A "flow" may be considered to be a series of frames exchanged between two connection endpoints defined by a layer three network address and a layer four port number pair for each end of the connection. Typically, a flow may be initiated by a request at one of the two connection endpoints for content which is accessible through the other connection endpoint. The flow that is created in response to the request may include packets containing the requested content, and control messages exchanged between the two endpoints. Generally, the content of a packet may be determined through inspecting the payload of the packet. That is, reading the payload of a packet enables a determination to be made regarding the content of the packet. Information used in the determination of content may include, but is not limited to, port numbers, protocol numbers, embedded addresses, file names, and file name extensions, e.g., a ".txt" or a ".gif" extension.

Once the content of a packet is inspected or read, a compression technique for the packet may be chosen based upon substantially only the content of the packet. Alternatively, a compression technique may be chosen based upon both the content of the packet and either the current or estimated congestion level in the network.

Figure 3:
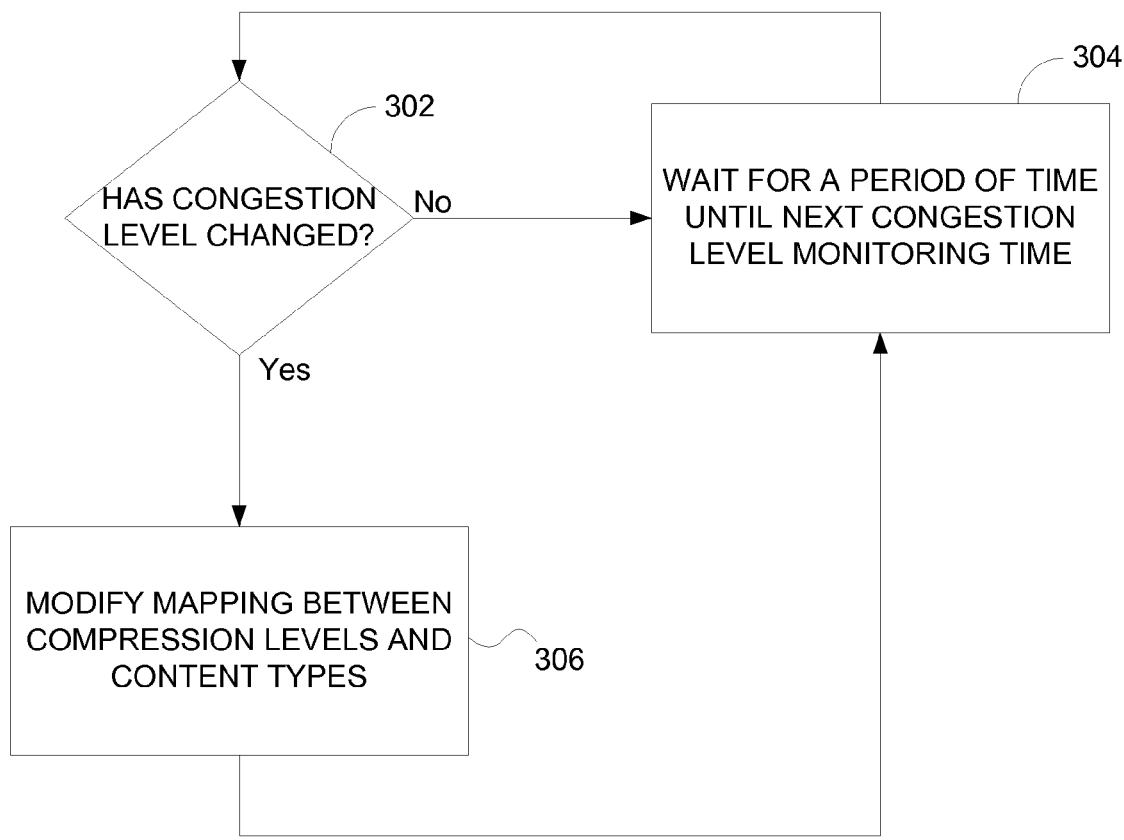
FIG. 3 is a top-level flowchart describing steps of compressing data to be transmitted across a network according to one embodiment of the present invention.

FIG. 3 is a flowchart depicting the operation of a controller, i.e., controller 210 of FIG. 2, at a high level in accordance with an embodiment of the present invention. At step 302, controller 210 determines if the degree of congestion or the congestion level in a network or on a network link has changed since the last measurement. In one embodiment, controller 210 uses congestion estimator 212 to make such a determination. If the degree of congestion has not changed, the current mapping between compression levels and content types is left intact, i.e., remains unchanged, and controller 210 waits for the next congestion measurement time at step 304. Once a suitable period of time has elapsed, the congestion level is measured again at step 302. Alternatively, if it is determined in step 302 that the degree of congestion has changed, the mapping between compression levels and content types is modified by controller 210 at step 306. After the mapping is modified, then process flow proceeds to step 304 in which controller 210 awaits the next congestion level monitoring time.

Figure 4:
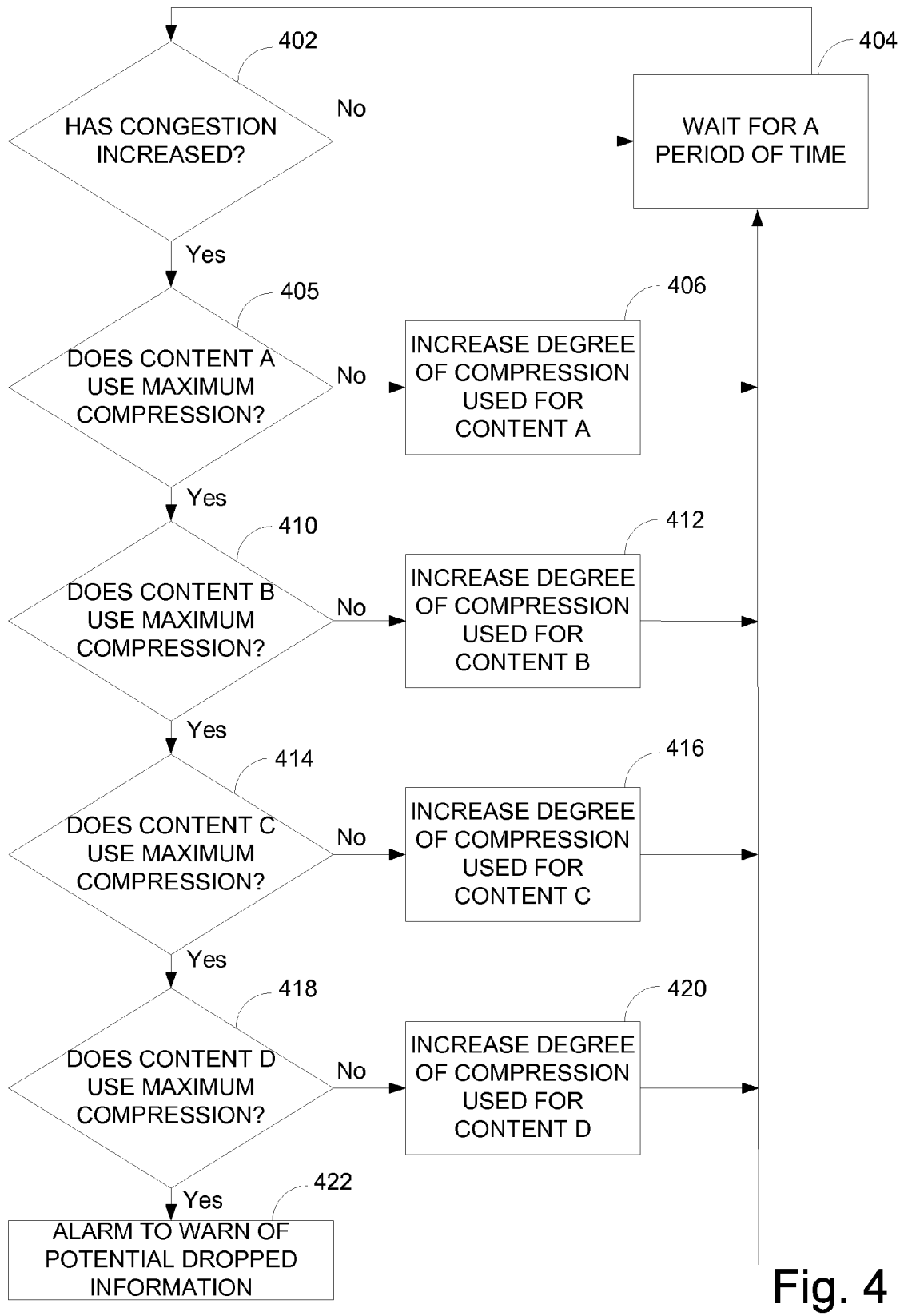
FIG. 4 is a detailed flowchart describing steps of compressing data to be transmitted across a network according to one embodiment of the present invention.

Modifying the mapping between compression levels and content types typically involves raising the compression level for a particular content type to free up additional bandwidth on a network link for other content types. That is, the degree of compression used for a particular content type may generally be raised until it reaches a maximum level. This dynamic adaptation or mapping of compression ratios based on content types serves to reduce congestion and data loss within a network. With reference to FIG. 4, the operation of a controller, i.e., controller 210 of FIG. 2, will be described in accordance with an embodiment of the present invention. In general, the operation of controller 210, as will be described with respect to FIG. 4, is a more detailed description of the high level description discussed above with respect to FIG. 3. For ease of illustration, FIG. 4 assumes that there are four different types of content that are associated with packets, although it should be appreciated that, in general, there may be fewer or more types of content.

A determination is made by a controller in step 402 regarding whether congestion has increased within a network. That is, it is determined whether a congestion level has increased since a previous measurement of the congestion level. If it is determined that the congestion level has not increased, e.g., that the congestion level has remained substantially unchanged since the previous measurement, then process flow proceeds to step 404 in which the controller waits for a predetermined period of time. Once the predetermined period or length has elapsed and the next congestion measurement time arrives, process flow returns to step 402 and the determination of whether congestion has increased.

If the determination in step 402 is that congestion within the network has increased, then the indication is that additional data compression is desired. Accordingly, a determination is made in step 405 as to whether data which has been identified as being "content A" data has been compressed using maximum compression. If it is determined that "content A" data has not been compressed using the maximum compression available, then the degree of compression used for "content A" data is increased in step 406. Then, process flow proceeds to step 404 in which the controller waits for the next congestion measurement time.

Alternatively, if it is determined in step 405 that "content A" data has already been compressed using the maximum compression available, then a determination is made in step 410 as to whether "content B" data has been compressed using the maximum compression available. When it is determined that "content B" data has not been compressed using the maximum compression available, the degree of compression used for "content B" data is increased in step 412. After the degree of compression used for "content B" data is increased, the controller awaits the next congestion measurement time in step 404.

If the maximum compression available has already been used to compress "content B" data, then the controller makes a determination in step 414 regarding whether "content C" data has been compressed using the maximum compression available. When the maximum compression available has not been used to compress "content C" data, then process flow moves from step 414 to step 416 in which the compression used for "content C" data is increased. Once the compression used for "content C" data is increased, the controller waits for the next congestion measurement time in step 404.

In the event that the maximum compression available for "content A" data, "content B" data, and "content C" data has already been used, it is determined in step 418 if "content D" data has already been compressed using the maximum compression available. If it is determined that the maximum compression available has not been used for "content D" data, then the compression used for "content D" data is increased in step 420. Then, process flow proceeds from step 420 to step 404 in which the controller waits for the next congestion measurement time.

Alternatively, if it is determined in step 418 that "content D" data has been compressed using the maximum compression available, then the implication is that data may not be further compressed, i.e., no additional compression is possible to alleviate congestion within the network. In the described embodiment, when further compression of data is no longer feasible, an alarm or other indication is sent to a user or a higher level application in step 422. Such an alarm generally warns of the potential for dropped information due to network congestion. After the alarm is sent, process flow moves from step 422 to step 404 in which the controller waits for the next congestion measurement time.

In general, degrees of compression may include a variety of different compression levels. By way of example, degrees of compression may include a low compression level, a medium compression level, and a high compression level. The low compression level may have an estimated compression ratio of approximately 1.5 to 1 and an average delay time of approximately 1 millisecond (ms) per 40 megabytes (Mb), while the medium compression level may have an estimated compression ration of approximately 3 to 1 and an average delay time of approximately 10 ms per 40 Mb. Finally, the high compression level may have a compression ration of approximately 4 to 1 and an average delay time of approximately 1 second per 40 Mb. It should be appreciated that the use of three compression levels is but an example of the number of compression levels which are possible.

Figure 5:
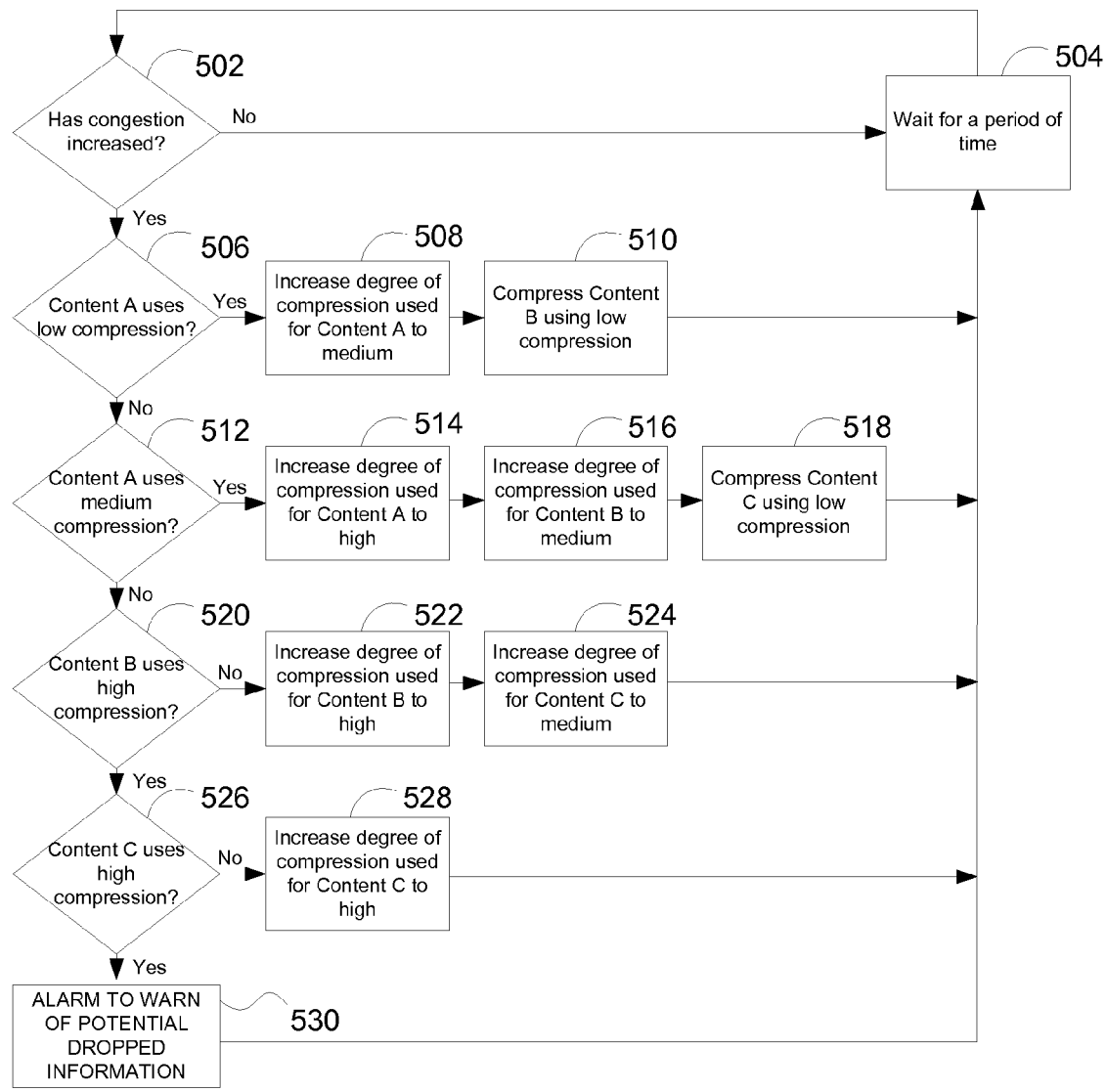
FIG. 5 is a detailed flowchart describing incremental steps of compressing data to be transmitted across a network according to one embodiment of the present invention.

FIG. 5 is a process flow diagram which illustrates the processing steps of a controller, i.e., controller 210 of FIG.

2, in a data compression system which includes four content types and three compression levels, in accordance with an embodiment of the present invention. In a system which includes four content types and three compression levels, or, more specifically, three levels of compression processors, "content A" data be the first type of content to be compressed, while "content D" data is preferably not subject to compression.

At step 502, a controller makes a determination as to whether congestion in a network has increased. If it is determined that congestion in the network has not increased, then process flow moves to step 504 in which the controller waits until an appropriate, e.g., predetermined, amount of time has elapsed before monitoring the congestion level again. Once an appropriate amount of time has elapsed, and the next congestion measurement time has arrived, process flow returns to step 502 in which the controller determines whether congestion in the network has increased.

If it is determined in step 502 that congestion in the network has increased, a determination is made in step 506 as to whether "content A" data has been compressed using a low level of compression. If it is determined that "content A" data has been compressed using a low level of compression, then, in the described embodiment, the level of compression for "content A" data may be dynamically adapted, e.g., raised, while "content B" data may be compressed using a low level of compression. Accordingly, in step 508, the degree of compression used for "content A" data is raised to a medium level of compression, and in step 510, "content B" data is compressed using a low level of compression. It should be appreciated that when "content A" data is compressed using a medium level of compression and "content B" data is compressed using a low level of compression, "content C" data and "content D" data are allowed to pass through the network in uncompressed formats. Once "content B" data is compressed using a low level of compression, process flow proceeds to step 504 in which the controller awaits the next congestion measurement time.

Returning to step 506, if it is determined that "content A" data has not been compressed using a low compression level, a determination is made in step 512 regarding whether "content A" data has been compressed using a medium level of compression. When "content A" data has been compressed using a medium level of compression, the degree of compression used for "content A" data is raised to a high level in step 514. Then, in step 516, the degree of compression used for "content B" data is raised to a medium compression level. In one embodiment, when "content B" data is compressed using a medium compression level, then "content C" data is compressed in step 518 at a low compression level. After "content C" data is compressed at a low compression level, the controller waits for the next congestion measurement time in step 504.

When it is determined in step 512 that "content A" data has not been compressed using a medium compression level, then the indication is that "content A" data has been compressed using a high compression level. Accordingly, "content A" data may not be compressed further. From step 512, process flow moves to step 520 in which it is determined if "content B" data has been compressed using a high compression level. If the determination is that "content B" data has not been compressed using a high compression level, then the degree of compression used for "content B" data is raised to a high compression level in step 522. Upon raising the compression level for "content B" data to a high compression level, the degree of compression used for "content C" data is raised to a medium compression level in step 524.

After the compression level for "content C" data is raised, process flow moves to step 504 in which the controller waits for a period of time to elapse before once again measuring congestion in the network.

Returning to step 520, when content "B" data is determined to have already been compressed using a high compression level, then it is determined in step 526 whether "content C" data has been compressed using a high compression level. If "content C" data has not been compressed using a high compression level, then in step 528, the compression level for "content C" data is raised to high, after which the controller waits for the next congestion measurement time in step 504. Alternatively, if it is determined that "content C" data has already been compressed using a high compression level, then, in the described embodiment, the indication is that data may not be further compressed to provide additional bandwidth for data transmission across the network. As such, in step 530, an alarm is sent to warn a network service provider or a user of the potential for incomplete data transmission. After the alarm is sent, process flow proceeds to step 504 in which the controller awaits the next congestion measurement time.

Although only a few embodiments of the present invention have been described, it should be understood that the present invention may be embodied in many other specific forms without departing from the spirit or the scope of the present invention. By way of example, while compression units have been described as being suitable for specific types of data content, i.e., each compression unit has been described as being specific to a particular content types, compression units may generally be associated with different compression levels. That is, rather than having compression units that are specific to content types, a particular compression unit may be arranged to compress data of substantially any content using a specific content level. In one embodiment, one compression unit may be arranged to compress data of substantially any content using a low compression level, while another compression unit may be arranged to compress data of substantially any content using a medium compression level.

In general, the steps associated with the various methods and processes of the present invention may be widely varied. Steps may be altered, added, removed, and reordered without departing from the spirit or the scope of the present invention. For instance, while the operation of a controller has generally be described in terms of handling an increase in congestion, the controller often also handles decreases in congestion as well. As such, it should be appreciated that the process flow diagram of FIG. 4 may be altered to include steps associated with handling decreases in congestion, e.g., steps associated with decreasing the degree of compression used for various content levels may be added.

While the process of raising compression levels has effectively been described, e.g., with respect to FIG. 5, as being a process in which compression levels are changed in parallel, it should be understood that the process of raising compression levels may instead be serial. By way of example, as described above, when the compression level for content A data is raised from low to medium, then the compression level for content B data is raised from none to low. However, in one embodiment, when compression levels are essentially raised serially, then the compression level for content B data, for instance, would not be raised from none to low until after the compression level for content A data has already reached its maximum, e.g., a high level. Similarly, the compression level for content C data would not be raised from none to low until after the compression levels for content A data and content B data have already reached their maximums.

Generally, content D data is described as remaining uncompressed such that packets which include content D data may use available bandwidth within a network for transmission. It should be appreciated that content D data may be subject to compression, e.g., after data of other content types have all been compressed at their maximum levels. Further, content D data may also be subject to different levels of compression.

The choice of a compression level for a packet has generally been described as being dependent upon both a congestion level and the content of the packet. In general, however, the choice of a compression level is not necessarily dependent upon either the current or estimated congestion level in a network. In other words, the choice of a compression level may be based substantially only upon the content of a packet.

Further, the content of a packet has essentially been described as being substantially unrelated to the priority of the data within the packet. The transmission priority of certain kinds of data, however, may be accounted for in determining the order in which packets are to be compressed in one embodiment. That is, the content of data may be at least partially related to the priority of the data without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for forwarding data across a communications network, the method comprising:
   associating a first data compression method of a plurality of data compression methods with a first data content type, the first data compression method having an associated first amount of compression;
   associating a second data compression method of a plurality of data compression methods with a second data content type, the second data compression method having an associated second amount of compression;
   determining when a level of congestion associated with the communications network has increased;
   raising the first amount of compression when it is determined that the first amount of compression is not at a maximum level associated with the first data compression method;
   determining whether the second amount of compression is at a maximum level associated with the second data compression method when it is determined that the first amount of compression is at the maximum level associated with the first data compression method; and
   raising the second amount of compression when it is determined that the second amount of compression is not at the maximum level associated with the second data compression method.

2. The method of claim 1 further including:
   raising an exception if it is determined that the second amount of compression is at the maximum level associated with the second data compression method.

3. The method of claim 1 further including:
   associating a third data compression method of a plurality of data compression methods with a third data content type, the third data compression method having an associated third amount of compression;
   determining whether the third amount of compression is at a maximum level associated with the third data compression method when it is determined that the second amount of compression is at the maximum level associated with the second data compression method; and
   raising the third amount of compression if it is determined that the third amount of compression is not at the maximum level associated with the third data compression method.

4. A computer program product for forwarding data across a communications network, the computer program product comprising:
   code devices that cause a first data compression method of a plurality of data compression methods to be associated with a first data content type, the first data compression method having an associated first amount of compression;
   code devices that cause a second data compression method of a plurality of data compression methods to be associated with a second data content type, the second data compression method having an associated second amount of compression;
   code devices that cause a determination of when a level of congestion associated with the communications network has increased;
   code devices that cause the first amount of compression to be raised when it is determined that the first amount of compression is not at a maximum level associated with the first data compression method;
   code devices that cause a determination of whether the second amount of compression is at a maximum level associated with the second data compression method when it is determined that the first amount of compression is at the maximum level associated with the first data compression method;
   code devices that cause the second amount of compression to be raised when it is determined that the second amount of compression is not at the maximum level associated with the second data compression method; and
   a computer-readable medium that stores the code devices.

5. The computer program product of claim 4 further including:
   code devices that cause an exception to be raise if it is determined that the second amount of compression is at the maximum level associated with the second data compression method.

6. The computer program product of claim 4 further including:
   code devices that cause a third data compression method of a plurality of data compression methods to be associated with a third data content type, the third data compression method having an associated third amount of compression;
   code devices that cause a determination of whether the third amount of compression is at a maximum level associated with the third data compression method when it is determined that the second amount of compression is at the maximum level associated with the second data compression method; and
   code devices that cause the third amount of compression to be raised if it is determined that the third amount of compression is not at the maximum level associated with the third data compression method.

7. An apparatus for forwarding data across a communications network, the apparatus comprising:

means for associating a first data compression method of a plurality of data compression methods with a first data content type, the first data compression method having an associated first amount of compression;

means for associating a second data compression method of a plurality of data compression methods with a second data content type, the second data compression method having an associated second amount of compression;

means for determining when a level of congestion associated with the communications network has increased;

means for raising the first amount of compression when it is determined that the first amount of compression is not at a maximum level associated with the first data compression method;

means for determining whether the second amount of compression is at a maximum level associated with the second data compression method when it is determined that the first amount of compression is at the maximum level associated with the first data compression method; and means for raising the second amount of compression when it is determined that the second amount of compression is not at the maximum level associated with the second data compression method.

8. The apparatus of claim 7 further including:

means for raising an exception if it is determined that the second amount of compression is at the maximum level associated with the second data compression method.

9. The apparatus of claim 7 further including:

means for associating a third data compression method of a plurality of data compression methods with a third data content type, the third data compression method having an associated third amount of compression;

means for determining whether the third amount of compression is at a maximum level associated with the third data compression method when it is determined that the second amount of compression is at the maximum level associated with the second data compression method; and means for raising the third amount of compression if it is determined that the third amount of compression is not at the maximum level associated with the third data compression method.

\* \* \* \* \*